(12) United States Patent
Sankar et al.

(10) Patent No.: US 8,935,255 B2
(45) Date of Patent: Jan. 13, 2015

(54) SOCIAL STATIC RANKING FOR SEARCH

(75) Inventors: Sriram Sankar, Palo Alto, CA (US); Gintaras Andrius Woss, East Palo Alto, CA (US); Rajat Raina, Mountain View, CA (US); Maxim Gubin, Walnut Creek, CA (US)

(73) Assignee: Facebook, Inc., Menlo Park, CA (US)

( * ) Notice: Subject to any disclaimer, the term of this patent is extended or adjusted under 35 U.S.C. 154(b) by 55 days.

(21) Appl. No.: 13/560,889

(22) Filed: Jul. 27, 2012

(65) Prior Publication Data
US 2014/0032564 A1   Jan. 30, 2014

(51) Int. Cl.
*G06F 7/00* (2006.01)
*G06F 17/30* (2006.01)

(52) U.S. Cl.
CPC .......... *G06F 17/30321* (2013.01); *G06F 17/30* (2013.01)
USPC ............ 707/741; 707/748; 707/798; 707/802

(58) Field of Classification Search
CPC ................... G06F 17/30958; G06F 17/30613; G06F 17/30321; G06F 17/3053; G06Q 50/01
USPC .......................................................... 707/741
See application file for complete search history.

(56) References Cited

U.S. PATENT DOCUMENTS

| | | | |
|---|---|---|---|
| 8,180,804 B1* | 5/2012 | Narayanan et al. | 707/798 |
| 2008/0275861 A1* | 11/2008 | Baluja et al. | 707/5 |
| 2008/0294589 A1* | 11/2008 | Chu et al. | 706/55 |
| 2011/0093506 A1* | 4/2011 | Lunt et al. | 707/798 |
| 2011/0252121 A1* | 10/2011 | Borgs et al. | 709/223 |
| 2011/0295626 A1* | 12/2011 | Chen et al. | 705/7.11 |
| 2012/0078927 A1* | 3/2012 | Gollapudi | 707/755 |
| 2012/0173845 A1* | 7/2012 | Venkataramani | 711/216 |
| 2012/0215785 A1* | 8/2012 | Singh et al. | 707/741 |
| 2012/0299925 A1* | 11/2012 | Najork et al. | 345/440 |
| 2012/0304050 A1* | 11/2012 | Tiu et al. | 715/234 |
| 2012/0317121 A1* | 12/2012 | Fuchs et al. | 707/741 |
| 2013/0086057 A1* | 4/2013 | Harrington et al. | 707/732 |
| 2013/0097180 A1* | 4/2013 | Tseng | 707/748 |
| 2013/0110835 A1* | 5/2013 | He | 707/737 |
| 2013/0124504 A1* | 5/2013 | Haugen et al. | 707/722 |
| 2013/0124538 A1* | 5/2013 | Lee et al. | 707/749 |
| 2013/0173633 A1* | 7/2013 | Piepgrass et al. | 707/748 |
| 2014/0006414 A1* | 1/2014 | Oikonomou | 707/748 |

OTHER PUBLICATIONS

U.S. Appl. No. 13/560,212, filed Jul. 27, 2012, Lassen.
U.S. Appl. No. 13/723,861, filed Dec. 21, 2012, Lassen.

* cited by examiner

*Primary Examiner* — Binh V Ho
(74) *Attorney, Agent, or Firm* — Baker Botts L.L.P.

(57) ABSTRACT

In one embodiment, one or more computing devices assign each of a plurality of nodes of a graph of a social-networking system to one of a plurality of search indices. Each search index corresponds to a node type, and each node assigned to a search index is of the node type that the search index corresponds to. For each search index, the one or more computing devices determine a value for each node assigned to the search index based at least in part on edges connected to the node in the graph and rank the nodes assigned to the search index based at least in part on their values. The one or more computing devices provide the search indices for storage to facilitate responding to queries encompassing objects represented by the nodes assigned to the search indices.

17 Claims, 2 Drawing Sheets

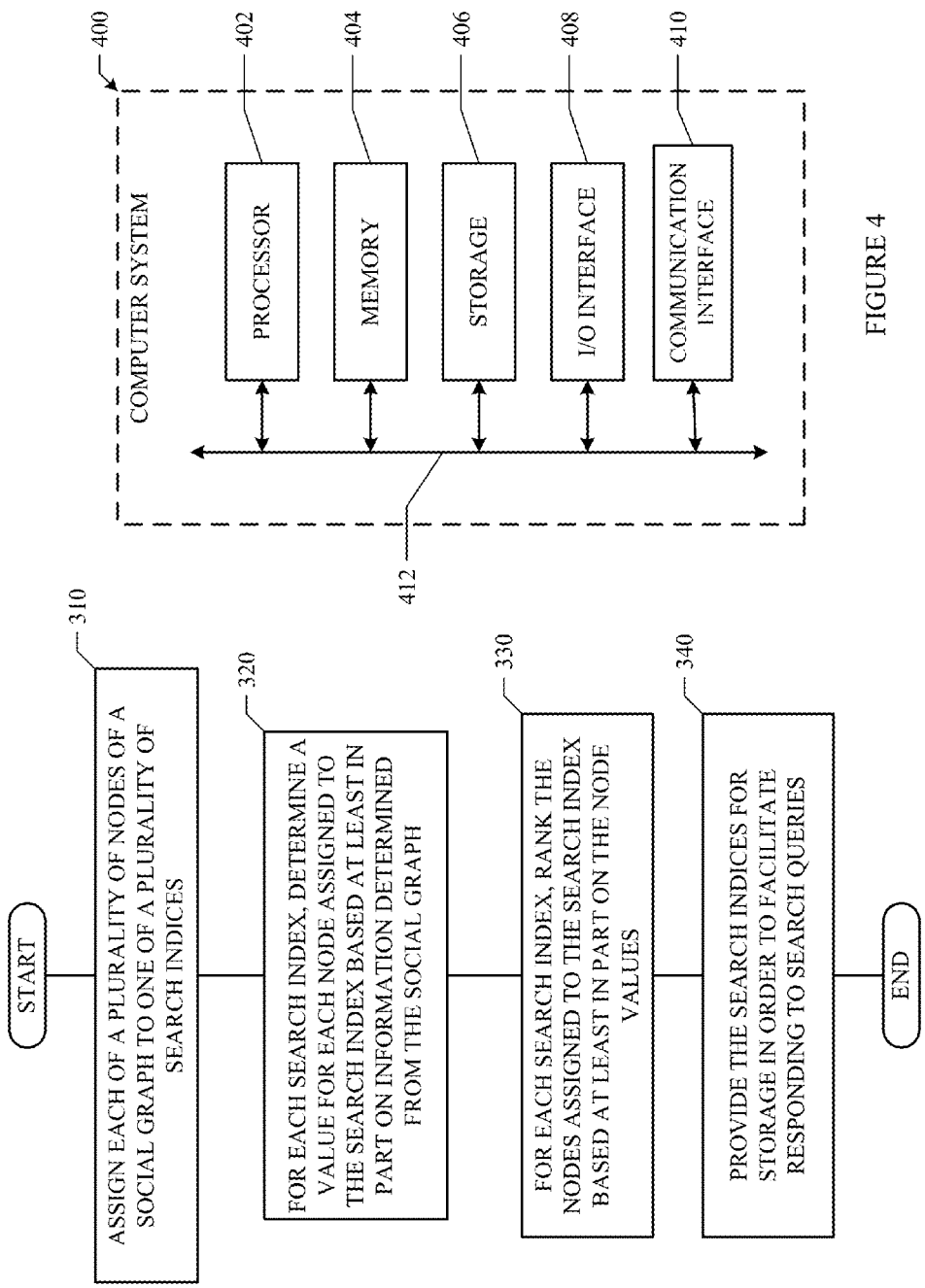

SOCIAL STATIC RANKING FOR SEARCH

TECHNICAL FIELD

This disclosure generally relates to improving the quality of search results identified for search queries.

BACKGROUND

The Internet provides a vast amount of information, which may be stored at many different sites and on many different devices, such as on servers and clients or in databases, around the world. These different devices at the different sites are communicatively linked to computer or communication networks over wire-line or wireless connections. A person may access specific pieces of information available on the Internet using a suitable network device (e.g., a computer, a smart mobile telephone, etc.) connected to a network.

Due to the sheer amount of information available on the Internet, it is impractical as well as impossible for a person (e.g., a network user) to manually search throughout the Internet for the specific pieces of information he needs. Instead, most network users rely on different types of computer-implemented tools to help them locate the desired information. One of the most commonly and widely used computer-implemented tools is a search tool, also referred to as a search engine. To search for information relating to a specific topic on the Internet, a user typically provides a few words, often referred to as a "search query" or simply "query", describing the topic to a search tool. The search tool conducts a search based on the search query using various search algorithms and generates a set of search results, each corresponding to some information that is likely to be related to the search query. The search results are then presented to the user.

Sophisticated search tools implement many functionalities to better identify relevant search results. For example, a search tool may search an index of documents or items according to one or more search algorithms in order to generate a set of search results in response to a search query. The index of documents or items, also called a search index, may be ranked in a particular order (e.g., most important to least important) that may be independent of any search query. There are continuous efforts to improve the quality of search results generated by search tools.

BRIEF DESCRIPTION OF THE DRAWINGS

FIG. 3 illustrates an example method of ranking social graph nodes in a search index.

FIG. 4 illustrates an example computer system.

DESCRIPTION OF EXAMPLE EMBODIMENTS

Figure 2:
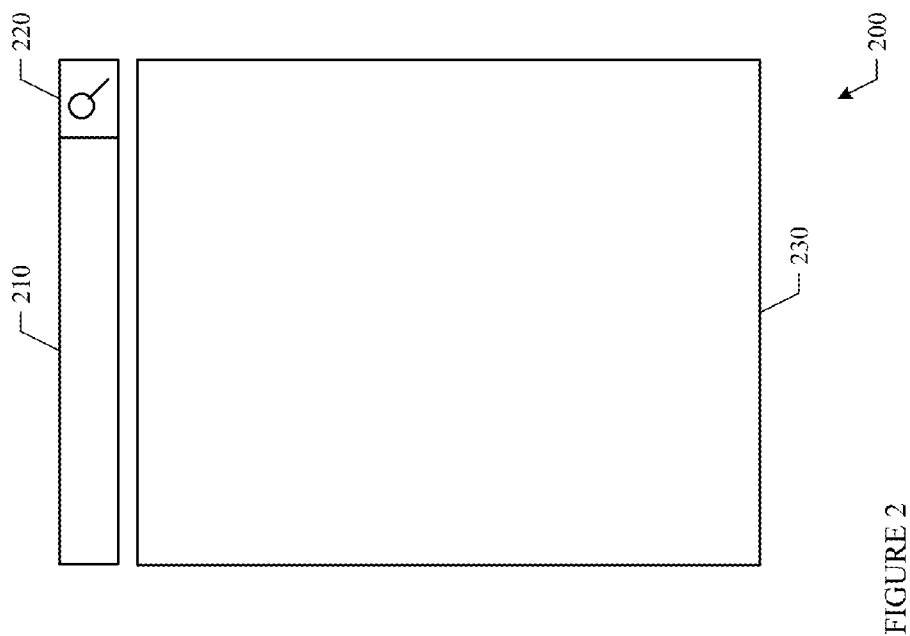
FIG. 2 illustrates an example user interface through which a user may search for information.

In particular embodiments, a computer-implemented search tool is designed to search for information relevant to specific topics on one or more networks, such as the Internet or an Intranet. To conduct a search, a network user may issue a search query to the search tool. The search query generally contains one or more words that describe a topic. In response, the search tool may identify a set of search results, each corresponding to some information that is likely to be related to the search query. A search tool may search an index of documents or items according to one or more search algorithms in order to generate a set of search results in response to a search query. The index of documents or items, also called a search index, may be ranked in a particular order (e.g., most important to least important) that may be independent of any search query.

When ranking a set of items in a search index, many different factors may be considered. In particular embodiments, the search tool may be provided by or associated with a social-networking system. The social-networking system may have any number of features, such as, for example and without limitation, enabling its users to contact their friends via emails or messages, organize events, form social groups, upload and share photos, read news feeds, use various web-based applications (e.g., provided either by the social-networking system or third parties), play online games, and so on. In particular embodiments, one or more items in the search index may be associated with such a feature of the social-networking system. When ranking the items in a search index of the social-networking system, the level of interaction the social-networking system's users have with the item may be taken into consideration.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, organize events, etc. In particular embodiments, entities of a social network (including, for example, individuals, organizations, locations, or events) may have associated web pages within a social-networking website. Each of these web pages may contain information related to its associated entity. For example, a web page for a user of the social network, which may be referred to as a user profile page, may contain information about the user including, for example photographs of the user, information about the user's interests, or the user's academic or professional background. Similarly, the profile page for an event, a location, or an organization may contain information about the event (e.g., invitees, time, and place of the event), the location (e.g., pictures of the location or a map of the location), or the organization (e.g., information about the organization and its members or the contact information of the organization). The profile page for a user or other entity may be accessible to other users or entities of the social network depending, for example, on privacy settings for the profile page. For example, the social network may allow users to post information or messages (such as, for example, user status, comments, photographs, or multimedia files) known as "posts" on another user or entity's profile page in a section of the page known as a "wall." In particular embodiments, the wall of a profile page of an entity may be a pre-determined section of a profile page that is accessible to other entities of the social network. In particular embodiments, the wall of a profile page may be organized in a dynamically arranged, chronological manner, and this type of wall may be referred to as a "timeline" for an entity of the social network.

A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a social graph that may have any number of nodes and edges, an example of which is illustrated in FIG. 1.

Figure 1:
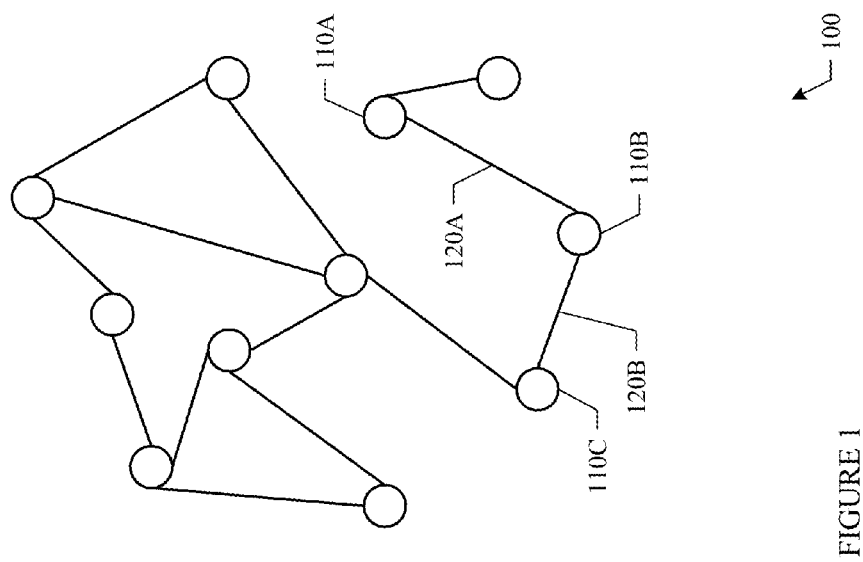
FIG. 1 illustrates an example social graph that represents the information contained in a social-networking system.

In social graph 100 illustrated in FIG. 1, each node may represent an entity, which may be human (e.g., user of the social-networking system) or non-human (e.g., location/place, event, action, business, object, message, post, image/photo/video, page, news feed, application, group, etc.). Two nodes are connected with an edge if the two nodes are related in some way (i.e., there is a relationship between the two nodes). Example cases when two nodes in social graph 100 may be related and thus connected with an edge may include, without limitation, (1) the two nodes represent two users of a social-networking system respectively, and the two users are socially connected (e.g., friends of each other); (2) the two nodes represent a user of the social-networking system and an event respectively, and the user has attended the event; (3) the two nodes represent a user of the social-networking system and a location, and the user has been to the location; (4) the two nodes represent a user of the social-networking system and a page on the social-networking system, and the user has interacted with (e.g., viewed) the page; (5) the two nodes represent an event and a location respectively, and the event is held at the location; (6) the two nodes represent a user of the social-networking system and an image (e.g., a digital photograph) respectively, and the user is in the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities, without limitation. Any type of relationship between two human or non-human entities may result in a connection between the two entities. Furthermore, one or more nodes of social graph 100 may be located outside of the social-networking system. As an example, one or more nodes of social graph 100 may be located at a third-party location external to the social-networking system; additionally, edges may connect these external nodes to nodes within the social-networking system.

In social graph 100, when there is an edge between two specific nodes, the two nodes may be considered directly related. For example, edge 120A connects nodes 110A and 110B, and thus nodes 110A and 110B are directly related. Similarly, edge 120B connects nodes 110B and 110C, and thus nodes 110B and 110C are directly related. When there is no edge between two particular nodes, the two nodes may still be considered indirectly related. For example, there is no edge directly connecting nodes 110A and 110C; however, nodes 110A and 110C may still be considered indirectly related through node 110B.

FIG. 2 illustrates an example user interface 200 through which a user may provide search queries and receive search results. In this case, there is an input field 210 through which a user may provide search queries, an icon 220 through which the user may submit the search queries (e.g., by clicking on icon 220), and an output field 230 where the search results may be displayed. In particular embodiments, a user interface, such as the one illustrated in FIG. 2, may be incorporated in a web page or a window panel for display on the screen of an electronic device. For example, interface 200 may be displayed on the screen of a mobile telephone or tablet. Note that in the example user interface 200 illustrated in FIG. 2, an icon 220 is illustrated for submitting the search queries. This icon is not necessary in all cases.

In particular embodiments, a search tool may be provided by or associated with a social-networking system to enables its users to search for information relating to specific topics in a social context. The information represented by a social graph, such as the one illustrated in FIG. 1, may be used to help identify and rank items (e.g., nodes in social graph 100) in one or more search indices of the social-networking system. When the search tool receives a search query from a user, it may identify a set of search results considered relevant to the search query. The search tool may search an index of documents or items according to one or more search algorithms in order to generate a set of search results in response to the search query. In order to provide better search results, the index of documents or items, also called a search index, may be ranked in a particular order (e.g., most important to least important) that may be independent of any search query.

The search tool of a social-networking system may employ multiple search indices for the multiple types of topics or items that its users may search for. As an example, and without limitation, there may be separate and independent search indices for photos or videos, users, applications, locations, pages, posts, groups, events, or any other type of node in the social graph 100 of the social-networking system. The items in each search index may be ranked based on various factors and independent of any particular search query. In particular embodiments, the items in a search index that are ranked higher are presented to a user (in response to a search query) before items in a search index that are ranked lower. Existing search engines (e.g., search engines provided by Google, Microsoft, or Yahoo) may rank search results based mainly on content relevance but may not take into consideration social context or social information relevant to any social-networking system. Instead or in addition to content relevance, particular embodiments may take into consideration the social information available to the social-networking system (e.g., in the form of social graph 100) providing or associated with the search tool when ranking items in the search indices.

A single search query may, in the context of a social-networking system, potentially require a search over billions of documents or items to determine search results. In particular embodiments, a search index (or each of multiple search indices) of the social-networking system may rank the documents or items in the search index based on a value calculated for each document or item. The value of each document or item ranked in the search index, which may be referred to as the document's "static rank," may be calculated in a manner that is independent of any search query (e.g., the static rank of a document or item in a search index may be fixed across all possible search queries relating to the document or item). As discussed above, in particular embodiments, various types of information available to the social-networking system (e.g., in the form of social graph 100) may be used when ranking items in the search indices. Particular embodiments using information available to the social-networking system will be discussed in further detail below. In particular embodiments, the process of retrieving search results from a search index in a social-networking system may be organized into two stages. In the first stage, the social-networking system may determine the top N results (e.g., several thousand results) that satisfy the requirements of a search query by choosing the top N statically-ranked items in the relevant search index or indices. At a second stage, the social-networking system may apply another (possibly more complex) ranking model to these initial N results to determine the final results to return to a user. In this manner, search results that are both personalized to a user performing the search and that take into account a broader context within the social-networking system may be efficiently provided to the user.

In particular embodiments, an edge connecting a pair of nodes may represent a relationship between the pair of nodes. In particular embodiments, each edge may comprise one or more data objects or attributes corresponding to the relationship between a pair of nodes. As an example and not by way of limitation, a first user (e.g., 110A) may indicate that a second user (e.g., 110B) is a "friend" of the first user. In response to this indication, the social-networking system may transmit a "friend request" to the second user. If the second user confirms the "friend request," the social-networking system may create an edge (e.g., 120A) connecting the first user and the second user in social graph 100, and store the edge in one or more data stores (implemented in or by one or more of a variety of consolidated or distributed computing systems, databases, or data servers, within the social-networking system or at one or more external locations). This disclosure contemplates edges with any suitable attributes connecting user nodes. As an example and not by way of limitation, an edge may represent a friendship, a business relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In particular embodiments, the social-networking system may create an edge between a user node and a non-user node (e.g., photos or videos, applications, locations, pages, posts, groups, events, or any other type of node), between two user nodes, or between two non-user nodes in social graph 100. As an example and not by way of limitation, the social-networking system may construct a page corresponding to a location node for the "Old Pro," a sports bar in Palo Alto, Calif. The page may include a selectable "Like" icon. A user viewing the page (such as, for example, by using a web browser or a special-purpose application hosted by the user's client device) may indicate that she likes the location represented by the location node by selecting the "Like" icon (such as, for example, by clicking on the icon), which may cause the client device to transmit to the social-networking system a message indicating the user's liking of the sports bar. In response to the message, the social-networking system may create an edge between the user and the location node. In particular embodiments, the social-networking system may store the edge in one or more data stores. The data store may be implemented in or by one or more of a variety of consolidated or distributed computing systems, databases, or data servers within the social-networking system or at one or more external locations. Although this disclosure describes forming edges in a particular manner, this disclosure contemplates forming edges in any suitable manner. As an example and not by way of limitation, rather than visiting a page and clicking an icon, a user may use a mobile application or another suitable application that is operable to form an edge between the user's user node and another node. Moreover, although this disclosure describes particular types of edges, this disclosure contemplates any suitable types of edges.

Social graph 100 may comprise other types of edges between a user node and a non-user node, two user nodes, or two non-user nodes. In particular embodiments, an edge between a user node and a non-user node may represent a particular action or activity performed by a user of the user node toward the non-user node. As an example and not by way of limitation, in addition to a user liking a sports bar, a user may check-in to a place represented by a node in social graph 100. The page corresponding to a place may include, for example, a selectable "check in" icon or a selectable "add to favorites" icon. Similarly, by clicking on these icons, the social-networking system may create a "favorite" edge or a "check in" edge in response to the user's action corresponding to the node. Although this disclosure describes edges with particular attributes connecting user nodes and place nodes, this disclosure contemplates edges with any suitable attributes connecting a user node and any type of node. Moreover, although this disclosure describes edges between a user node and a non-user node representing a single relationship, this disclosure contemplates edges between any types of nodes representing one or more relationships. As an example and not by way of limitation, an edge may represent both that a user likes and has checked in at a particular place. Alternatively, a separate edge could be generated to represent each type of relationship (or multiples of a single relationship) between two nodes.

In particular embodiments, a particular entity (e.g., a location or a company) may correspond to one or more nodes. The social graph 100 may comprise a plurality of nodes corresponding to the same real-world entity. For example, multiple nodes may correspond to different pages about the same physical location. As an example and not by way of limitation, a popular restaurant may have several pages, such as, for example, a "fan page," an "official page," or a "review page," authored by various users. Each of these nodes may have its own set of relationships, represented as edges in social graph 100, and each of these nodes may be ranked individually in a search index. In yet other embodiments, the ranking of one of these nodes (e.g., the ranking of a fan page for a movie) may be influenced by the ranking of an associated node (e.g., the ranking of the official page for the same movie).

In particular embodiments, the social-networking system may determine a value for a node based on the based on the number and types of edges connected to the node. A particular node may be connected to one or more other nodes by one or more edges, and each edge may have particular attributes. In particular embodiments, the social-networking system may determine a value for a node based on the number of edges of each type connected to the node. As one example, for purposes of ranking or ordering a given node within a particular search index of the social-networking system, a value for the node may be calculated as follows. First, for each edge type connected to the node, the number of corresponding edges may be calculated. For example, the number of "likes" (one type of edge) that a given node has may be tabulated. Additionally, a weighting factor associated with a given edge type (for this particular search index) may be multiplied by the total number of edges of that type. For example, if a node has 20 "likes", and "likes" have a weighting factor of 0.5 for this particular search index, then for the edge type "like", the portion or sub-value of the node value will be 0.5×20, which is 10. Once the sub-value is calculated for each edge type for the node, the sub-values may then be combined (e.g., added) to obtain the final node value for ranking the node in this particular search index. In particular embodiments, the weighting factor may be positive, negative, a whole number, a fraction of a number, or any other suitable numerical value. The social-networking system may, in other embodiments, determine a value for a node based on a level of engagement within the network, as measured by a number of edges (e.g., actions) between the node and other nodes. Nodes with more edges may be given a greater value. For illustration purposes, this disclosure discusses values in generic "unit" terms (e.g., 1.0 units, 2.4 units, etc.), however this disclosure contemplates values with any suitable type of units. Moreover, this disclosure discusses values for nodes such that larger values may be considered more relevant, such as, for example, when ranking items in a search index. As an example and not by way of limitation, a node with 50 edges may be given a value of 5.0 units, while a node with 30 edges may be given a value of 2.4 units. As another example and not by way of limitation, the social-networking system may assign a score or value of 1.0 units to a node if the node has more than 100 edges connecting to user nodes, a score of 0.7 units if the node has more than 50 edges connecting to user nodes, or a score of 0.5 units if the node has 50 edges or less connecting to user nodes. In particular embodiments, the value given based on the number of edges may be normalized. As an example and not by way of limitation, the value for a location node may be normalized based on capacity of the location associated with the location node. For example, a first location node with 100 edges and a capacity of 100 people may be given the same value as a second location node with 10 edges and a capacity of 10 people. In particular embodiments, the social-networking system may determine a value for a node based on the attributes of the edges connected to the node. As discussed above, edges may have various attributes, and edges with particular attributes may be given more value than other types of edges. The social-networking system may identify the edges connected to a particular node and the attributes of those edges and then determine a value based on the attributes of the edges. As an example and not by way of limitation, for a location node associated with the location "Union Square," the social-networking system may give more weighting to edges of "checked in" than edges of "like." While counting a number of edges between a location node and user nodes, the social-networking system may determine a value for a "checked in" edge as 1.5 units, while determining a value for a "like" edge as 1.0 units. It is contemplated in this disclosure that edges with particular attributes may be given more value than other types of edges. As an example and not by way of limitation, for a location node associated with the location "Philz Coffee," the social-networking system may give more weighting to edges of "like" than edges of "checked in." Although this disclosure describes determining values for a node based on edge information in a particular manner, this disclosure contemplates determining values for nodes based on edge information in any suitable manner.

In particular embodiments, the social-networking system may determine a value for a node based on time stamps associated with the edges connected to the node. Edges that were generated more recently may be weighted more heavily when determining a value than edges that were generated in the past. As an example and not by way of limitation, the social-networking system may assign a score of 1.0 to a node if 100 edges were connected to that node in the past week, while the social-networking system may assign a score of 0.5 to a node if 100 edges were connected to that node in the past month. As another example and not by way of limitation, a node may be given a score of 1.0 for having 1000 edges connected to it in the past week, a score of 0.8 for having 1000 edges connected to it in the past two weeks, a score of 0.6 for having 1000 edges connected to it in the past month, and so on. Although this disclosure describes determining a value for a node based on time stamps associated with edges in a particular manner, this disclosure contemplates determining a value for a node based on time stamps associated with edges in any suitable manner.

In particular embodiments, the social-networking system may include a search index that enables users to search nodes of the social-networking system corresponding to images or videos. The nodes corresponding to images or videos may each have a value determined based on one or more factors, and the value may be used to rank the node in the image/video search index (or indices, if image and video are treated separately). As an example, and without limitation, factors used to compute a value for image or video nodes include the upload or capture date of an image or video (e.g., newer images or videos may have a higher value), the number of "likes" an image or video has (e.g., the more "likes," the higher the value), the number of comments an image or video has (e.g., the more comments, the higher the value), or the number of shares an image or video has (e.g., the more shares, the higher the value). Additionally, as further examples, and without limitation, for a node corresponding to video, the length (e.g., in seconds) or the bitrate of the video may be used to compute a value for the node (e.g., with longer videos or videos with higher bitrate being given higher values). In yet other embodiments, the number of tags (e.g., user labels) that a node corresponding to a video or image has may be used as a factor in computing a value for ranking the node. As an example, if a photo or video node has a number of tags greater than a particular threshold, the value calculated for the node may be less; that is, the node may be "penalized" in the image/video search index ranking for appearing like a spam image with numerous tags. In yet other embodiments, metadata in images or videos may be used to calculate node values for image or video nodes. As examples, metadata indicating what type of equipment created the image or video (e.g., a DSLR or a cell-phone camera), how much light was present in the image or video (e.g., whether flash was used, whether the photo is under- or over-exposed, whether the image or video was taken indoors or outdoors), or whether the faces of users of the social-networking system appear in the image or video (e.g., if a popular user is in an image) may be used to calculate a node value for an image or a video node.

In particular embodiments, the social-networking system may include a search index that enables users to search nodes of the social-networking system corresponding to graph nodes such as songs, albums, or any type of application (e.g., a game or a newsreader). The nodes corresponding to applications may each have a value determined based on one or more factors, and the value may be used to rank the node in the application search index. As an example, and without limitation, factors used to compute a value for application nodes include the number of users (e.g., game players or readers) the application has had in a pre-determined time period. For example, the number of users an application has had in the prior month, the prior week, the prior day, or prior hour may be used to compute a value for the application node (each timeframe having a different weighting factor, for example). Additionally, input from another system, including, for example, a quality score, may also be used to compute a value for an application node. The nodes corresponding to songs or albums may each have a value determined based on one or more factors, and the value may be used to rank the node in the song or album search index. As an example, and without limitation, factors used to compute a value for a song or album node include the number of listeners a song or an album has had in the prior month, the prior week, the prior day, or prior hour. Additionally, for application nodes, song nodes, or album nodes, the age of the node may be used to calculate a node value (e.g., the more recently the node was created, the higher the node value).

In particular embodiments, the social-networking system may include a search index that enables users to search nodes of the social-networking system corresponding to other users of the social-networking system. The nodes corresponding to users may each have a value determined based on one or more factors, and the value may be used to rank the node in the user search index. As an example, and without limitation, factors used to compute a value for a user node include the number of friends the user has (e.g., more friends lead to a higher value), the number of subscribers or one-way followers a user has (e.g., more subscribers lead to a higher value), or the age of a user (e.g., a younger user has a higher value).

In particular embodiments, the social-networking system may include a search index that enables users to search nodes of the social-networking system corresponding to events. The nodes corresponding to events may each have a value determined based on one or more factors, and the value may be used to rank the node in the event search index. As an example, and without limitation, factors used to compute a value for an event node include date of the event (e.g., how immediate the event is in the past or the future), the number of RSVPs an event has, or the number of wall- or timeline-posts an event has.

In particular embodiments, the social-networking system may include a search index that enables users to search nodes of the social-networking system corresponding to places (e.g., locations) or pages (e.g., entities having a webpage). The nodes corresponding to places may each have a value determined based on one or more factors, and the value may be used to rank the node in the places search index. As an example, and without limitation, factors used to compute a value for a place node include the number of likes that the place has, the number of wall- or timeline-posts the place has, the number of check-ins a place has, or the number of check-ins a place has weighted by the recency of the check-in (e.g., decaying the importance of a check-in with time, such as by multiplying a check-in from one month ago by 0.1 and a check-in from yesterday by 0.9). Similarly, the nodes corresponding to pages may each have a value determined based on one or more factors, and the value may be used to rank the node in the pages search index. As an example, factors used to compute a value for a page node include the number of likes the page has, the number of followers the page has, or the number of wall- or timeline-posts the page has, and each of these factors potentially may be weighted by recency. As an additional example, if a page has a URL that is faulty, this may be a factor that decreases the value of the node associated with that page.

In particular embodiments, the social-networking system may include a search index that enables users to search nodes of the social-networking system corresponding to posts in the social-networking system (e.g., wall- or timeline-posts or comments on wall- or timeline-posts, images, or other items). The nodes corresponding to posts may each have a value determined based on one or more factors, and the value may be used to rank the node in the post search index. As an example, and without limitation, factors used to compute a value for a post node include the recency of the post (e.g., posts created more recently have a higher value than posts created earlier in time, posts with more recent interaction have higher value than posts with older interactions), the number of comments a post has, the number of likes a post has, or any other measure of interaction with a post. In particular embodiments, a separate search index may be created for "high-interaction" posts (e.g., posts with a high number of comments or likes), and the ranking of post nodes within this search index may be less influenced by creation time and more influenced by the number of and recency of interactions with the post nodes.

In particular embodiments, the social-networking system may include a search index that enables users to search nodes of the social-networking system corresponding to groups of users of the social-networking system. The nodes corresponding to groups may each have a value determined based on one or more factors, and the value may be used to rank the node in the groups search index. As an example, and without limitation, factors used to compute a value for a group node include the number of members in the group, the date of creation of the group, or the amount of social interaction within the group (e.g., number of likes, comments, posts, or images exchanged with the group).

In particular embodiments, the social-networking system may determine a value for a node based on one or more factors, as described above, including social-graph information. These determined values may be combined or be cumulative with each other. The determined value for each factor may be additive, multiplicative, etc., with determined values for other factors. As an example and not by way of limitation, a social-networking system may give a value of 1.0 to a location node having 10 or more edges connected to it, and may give a value of 0.8 to a node corresponding to a location that had a user check-in in the past hour. Thus, a location node that had a user check-in in the past hour and has 10 or more edges may be given a value of 1.8. In particular embodiments, values determined based on particular factors may be weighted differently. Using the previous example, a location node with 10 or more edges that had a user check-in within the past hour may be given a value of $a*(1.0)+b*(0.8)$, where a and b are weightings that may be assigned to the particular factors. Although this disclosure describes determining discrete values for nodes based on particular factors, this disclosure contemplates determining non-discrete values for nodes based on a variety of factors.

In particular embodiments, the social-networking system may rank higher-valued nodes higher than lower-valued nodes within a search index, such that the node with the highest value is ranked first, and so on. In yet other embodiments, the social-networking system may rank lower valued nodes higher than higher-valued nodes within a search index, such that the node with the highest value is ranked last, and so on. Any suitable ranking scheme depending on computed node values is contemplated by this disclosure. In particular embodiments, the social-networking system may transmit information of a particular set of nodes. As an example and not by way of limitation, the social-networking system may rank the nodes within a particular search index based on respective scores or values, store the ranked search index in storage (implemented in or by one or more of a variety of consolidated or distributed computing systems, databases, or data servers within the social-networking system or in one or more external locations), and in response to a user search query, search the ranked index and present to the user information of top-ranked nodes from the search index that also meet the query requirements.

FIG. 3 illustrates an example method for implementing particular embodiments. The method begins at step 310, where the social-networking system assigns each of a plurality of nodes of a social graph to one of a plurality of search indices. As discussed above, the plurality of nodes may comprise nodes of various types, including user nodes and non-user nodes. Additionally, each search index may correspond to a node type, such that each node assigned to a given search index is of the corresponding node type for the search index. At step 320, the social-networking system may, for each search index, determine a value for each node assigned to the search index based at least in part on social context or other social information determined from the social graph. As an example, the value for each node assigned to a search index may be determined based at least in part on the edges connected to the node in the social graph. At step 330, the social-networking system may, for each search index, rank the nodes assigned to the search index based at least in part on the node values. As an example, the node with the highest value is at the front of the search index, and the node with the lowest value is at the end of the search index. At step 340, the social-networking system may provide the search indices for storage in order to facilitate responding to search queries involving objects represented by nodes of the social graph that are assigned to these search indices. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

The search tool functionalities described above may be implemented as a series of instructions stored on a computer-readable storage medium that, when executed, cause a programmable processor to implement the operations described above. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable non-transitory storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    assigning each of a plurality of nodes of a graph of a social-networking system to one of a plurality of search indices, each search index corresponding to a node type, each node assigned to a search index comprising the node type that the search index corresponds to;
    for each search index:
        determining a value for each node assigned to the search index, wherein the value is calculated based at least in part on one or more factors, wherein the factors comprise a number of edges of a particular edge type that are connected to the node in the graph or attributes of edges connected to the node in the graph, and wherein the value comprises a combination of sub-values, each sub-value being calculated for one of a plurality of edge types connected to the node; and
        ranking the nodes assigned to the search index based at least in part on their values; and
        providing the search indices for storage to facilitate responding to queries encompassing objects represented by the nodes assigned to the search indices.

2. The method of claim 1, wherein one or more of the nodes of the graph are external to the social-networking system in one more third-party systems.

3. The method of claim 1, wherein:
    the values for nodes assigned to a search index are determined according to pre-determined ranking criteria for the search index; and
    different search indices have different ranking criteria.

4. The method of claim 1, wherein:
    a first node type comprises users;
    a second node type comprises places/pages;
    a third node type comprises groups;
    a fourth node type comprises posts;
    a fifth node type comprises images/videos;
    a sixth node type comprises applications; and
    a seventh node type comprises events.

5. The method of claim 1, wherein calculating separate sub-values comprises, for each of the plurality of edge types connected to the node:
    determining a number of edges of the edge type connected to the node; and
    multiplying the number by a weight corresponding to the edge type.

6. The method of claim 1, wherein the search indices are stored within the social-networking system.

7. One or more computer-readable non-transitory storage media in one or more computing systems, the media embodying logic that is operable when executed to:
    assign each of a plurality of nodes of a graph of a social-networking system to one of a plurality of search indices, each search index corresponding to a node type, each node assigned to a search index comprising the node type that the search index corresponds to;
    for each search index:
        determine a value for each node assigned to the search index, wherein the value is calculated based at least in part on one or more factors, wherein the factors comprise a number of edges of a particular edge type that are connected to the node in the graph or attributes of edges connected to the node in the graph, and wherein the value comprises a combination of sub-values, each sub-value being calculated for one of a plurality of edge types connected to the node; and
        rank the nodes assigned to the search index based at least in part on their values; and
        provide the search indices for storage to facilitate responding to queries encompassing objects represented by the nodes assigned to the search indices.

8. The media of claim 7, wherein one or more of the nodes of the graph are external to the social-networking system in one more third-party systems.

9. The media of claim 7, wherein:
    the values for nodes assigned to a search index are determined according to pre-determined ranking criteria for the search index; and
    different search indices have different ranking criteria.

10. The media of claim 7, wherein:
    a first node type comprises users;
    a second node type comprises places/pages;
    a third node type comprises groups;
    a fourth node type comprises posts;
    a fifth node type comprises images/videos;
    a sixth node type comprises applications; and
    a seventh node type comprises events.

11. The media of claim 7, wherein calculating separate sub-values comprises, for each of the plurality of edge types connected to the node:
   determining a number of edges of the edge type connected to the node; and multiplying the number by a weight corresponding to the edge type.

12. The media of claim 7, wherein the search indices are stored within the social-networking system.

13. A first computing system comprising:
   a memory comprising instructions executable by one or more processors; and
   the one or more processors coupled to the memory and operable to execute the instructions, the one or more processors being operable when executing the instructions to:
   assign each of a plurality of nodes of a graph of a social-networking system to one of a plurality of search indices, each search index corresponding to a node type, each node assigned to a search index comprising the node type that the search index corresponds to;
   for each search index:
      determine a value for each node assigned to the search index, wherein the value is calculated based at least in part on one or more factors, wherein the factors comprise a number of edges of a particular edge type that are connected to the node in the graph or attributes of edges connected to the node in the graph, and wherein the value comprises a combination of sub-values, each sub-value being calculated for one of a plurality of edge types connected to the node; and
      rank the nodes assigned to the search index based at least in part on their values; and
      provide the search indices for storage to facilitate responding to queries encompassing objects represented by the nodes assigned to the search indices.

14. The system of claim 13, wherein one or more of the nodes of the graph are external to the social-networking system in one more third-party systems.

15. The system of claim 13, wherein:
   the values for nodes assigned to a search index are determined according to pre-determined ranking criteria for the search index; and
   different search indices have different ranking criteria.

16. The system of claim 13, wherein:
   a first node type comprises users;
   a second node type comprises places/pages;
   a third node type comprises groups;
   a fourth node type comprises posts;
   a fifth node type comprises images/videos;
   a sixth node type comprises applications; and
   a seventh node type comprises events.

17. The system of claim 13, wherein calculating separate sub-values comprises, for each of the plurality of edge types connected to the node:
   determining a number of edges of the edge type connected to the node; and
   multiplying the number by a weight corresponding to the edge type.

* * * * *